(12) United States Patent
Bian

(10) Patent No.: US 12,498,524 B2
(45) Date of Patent: Dec. 16, 2025

(54) STRUCTURES INCLUDING A GRATING COUPLER AND A LAYER EXHIBITING AN ELECTRIC-FIELD-INDUCED POCKELS EFFECT

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 400 days.

(21) Appl. No.: 18/209,710

(22) Filed: Jun. 14, 2023

(65) Prior Publication Data

US 2024/0419022 A1 Dec. 19, 2024

(51) Int. Cl.
*G02B 6/34* (2006.01)
*G02B 6/124* (2006.01)
*G02F 1/035* (2006.01)

(52) U.S. Cl.
CPC ............... *G02B 6/34* (2013.01); *G02B 6/124* (2013.01); *G02F 1/035* (2013.01)

(58) Field of Classification Search
CPC ................. G02B 6/34; G02B 6/124; G02B 2006/12107; G02F 1/035
USPC ..................................... 385/10, 37
See application file for complete search history.

(56) References Cited

U.S. PATENT DOCUMENTS

| | | | | |
|---|---|---|---|---|
| 5,420,947 A | * | 5/1995 | Li | G02B 6/34 |
| | | | | 359/569 |
| 7,221,825 B2 | * | 5/2007 | Reed | G02B 6/125 |
| | | | | 385/39 |
| 10,185,092 B1 | * | 1/2019 | Bian | G02B 6/305 |
| 11,378,743 B1 | | 7/2022 | Bian et al. | |
| 2017/0115456 A1 | * | 4/2017 | Sugama | G02B 6/305 |
| 2020/0341200 A1 | * | 10/2020 | Van Vaerenbergh | G02B 6/124 |

FOREIGN PATENT DOCUMENTS

CN 112782805 A * 5/2021 ............. G02B 6/30

OTHER PUBLICATIONS

"Wide bandwidth and high coupling efficiency Si3N4-on-SOI dual-level grating coupler" by Sacher et al., Optics Express, vol. 22, No. 9, pp. 10938-10947 (Year: 2014).*
Zhihua Chen et al., "Grating coupler on lithium niobate thin film waveguide with a metal bottom reflector," Optics Materials Express 7, 4010-4017 (2017).
Yang, Fan, Hong Fang, Huangpu Han, and Bingxi Xiang. 2022. "Wide Bandwidth Silicon Nitride Strip-Loaded Grating Coupler on Lithium Niobate Thin Film" Crystals 12, No. 1: 70. https://doi.org/10.3390/cryst12010070.

(Continued)

*Primary Examiner* — Robert Tavlykaev
(74) *Attorney, Agent, or Firm* — Thompson Hine LLP; Anthony Canale

(57) ABSTRACT

Structures including a grating coupler and a layer that exhibits an electric-field-induced Pockels effect and methods of forming such structures. The structure comprises a first grating coupler on a substrate, a second grating coupler having an overlapping relationship with the first grating coupler, and a layer including a portion having an overlapping relationship with the second grating coupler. The layer comprises a material that exhibits an electric-field-induced Pockels effect.

18 Claims, 7 Drawing Sheets

(56) References Cited

OTHER PUBLICATIONS

Ziliang Ruan et al., "Metal based grating coupler on a thin-film lithium niobate waveguide," Optics Express 28, 35615-35621 (2020).

Zhihua Chen, Yiwen Wang, Honghu Zhang, and Hui Hu, "Silicon grating coupler on a lithium niobate thin film waveguide," Optics Materials Express 8, 1253-1258 (2018).

C. Zhang and C. K. Madsen, "Demonstration of an As2S3-on-LiNbO3 Grating Coupler and its Application of Measuring a Grating-based Filter," in IEEE Photonics Journal, vol. 8, No. 6, pp. 1-7, Dec. 2016, Art No. 2701407, doi: 10.1109/JPHOT.2016.2616220.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B.Peng et al., "A Cmos Compatible Monolithic Fiber Attach Solution with Reliable Performance and Self-alignment," In Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Aboketaf et al., "Towards fully automated testing and characterization for photonic compact modeling on 300-mm wafer platform," 2021 Optical Fiber Communications Conference and Exhibition (OFC), San Francisco, CA, USA, 2021, pp. 1-3.

Y. Bian et al., "Integrated Laser Attach Technology on a Monolithic Silicon Photonics Platform," 2021 IEEE 71st Electronic Components and Technology Conference (ECTC), San Diego, CA, USA, 2021, pp. 237-244, doi: 10.1109/ECTC32696.2021.00048.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on a 300-mm Monolithic CMOS Silicon Photonics Platform," in EEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

Bian, Yusheng, "Structures for an Optical Coupler and Related Methods" filed on Aug. 22, 2022 as a U.S. Appl. No. 17/892,584.

\* cited by examiner

STRUCTURES INCLUDING A GRATING COUPLER AND A LAYER EXHIBITING AN ELECTRIC-FIELD-INDUCED POCKELS EFFECT

BACKGROUND

The disclosure relates to photonics chips and, more specifically, to structures including a grating coupler and a layer that exhibits an electric-field-induced Pockels effect and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser.

Thin film lithium niobate (TFLN) may be integrated into a photonic component. Lithium niobate is an electro-optical material characterized by optical properties, such as large second-order nonlinearity, a wide transparency window, and low nonlinear absorption, that are favorable for certain types of photonic components. Photonic components including a TFLN layer may generally suffer from several disadvantages, such as a large footprint and a limited power handling capability.

Improved structures including a grating coupler and a layer that exhibits an electric-field-induced Pockels effect and methods of forming such structures are needed.

SUMMARY

In an embodiment of the invention, a structure for a photonics chip is provided. The structure comprises a first grating coupler on a substrate, a second grating coupler having an overlapping relationship with the first grating coupler, and a layer including a portion that has an overlapping relationship with the second grating coupler. The layer comprises a material that exhibits an electric-field-induced Pockels effect.

In an embodiment of the invention, a structure for a photonics chip is provided. The structure comprises a first grating coupler on a substrate and a layer including a second grating coupler. The second grating coupler has an overlapping relationship with the first grating coupler, and the layer comprises a material that exhibits an electric-field-induced Pockels effect.

In an embodiment of the invention, a method of forming a photonics chip is provided. The method comprises forming a first grating coupler on a substrate, forming a second grating coupler having an overlapping relationship with the first grating coupler, and forming a layer including a portion that has an overlapping relationship with the second grating coupler. The layer comprises a material that exhibits an electric-field-induced Pockels effect.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
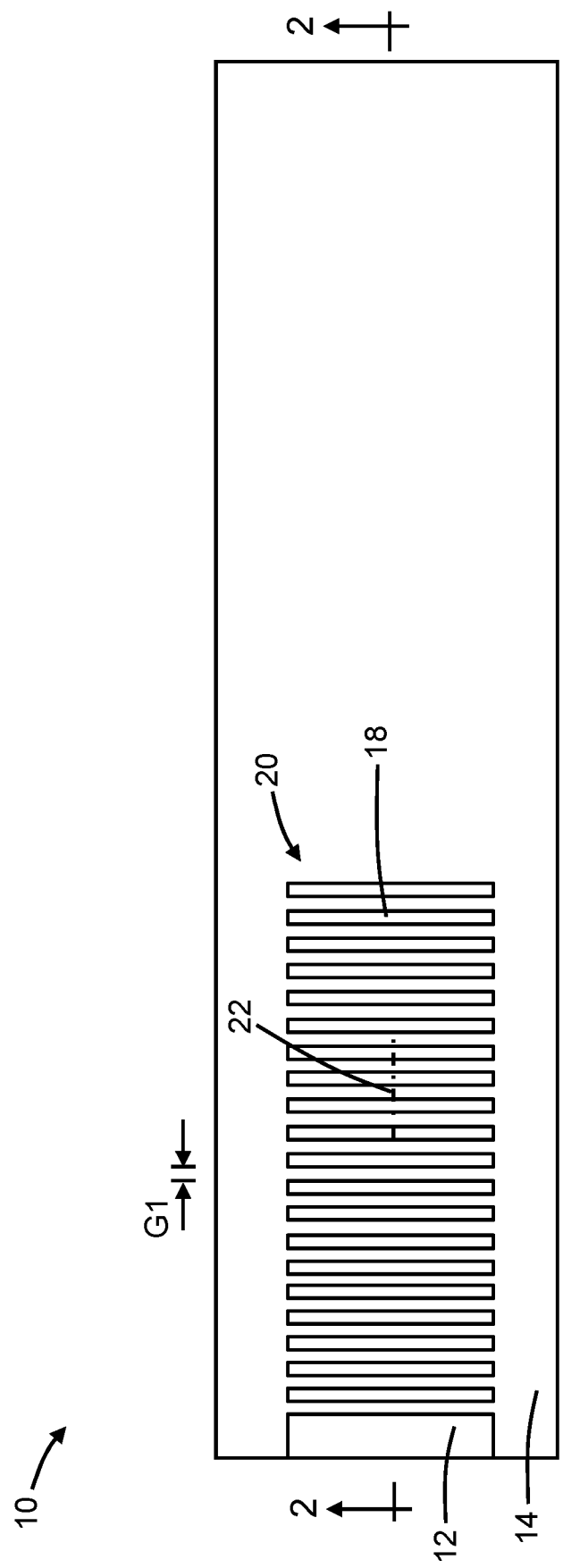
FIG. 1 is a top view of a structure at an initial fabrication stage of a processing method in accordance with embodiments of the invention.
Figure 2:
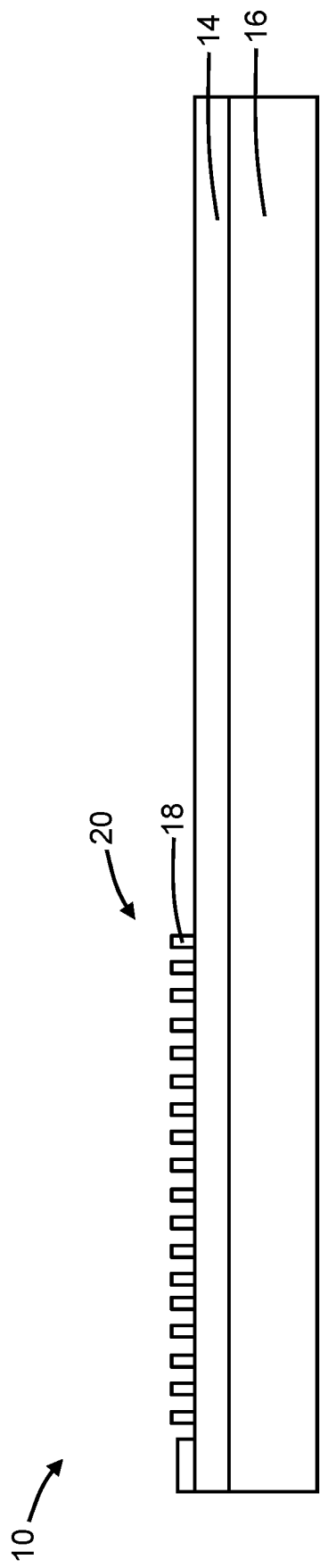
FIG. 2 is a cross-sectional view taken generally along line 2-2 in FIG. 1.

With reference to FIGS. 1, 2 and in accordance with embodiments of the invention, a structure 10 for a photonics chip includes a waveguide core 12 that is disposed on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate. The waveguide core 12 is separated from the semiconductor substrate 16 by the dielectric material of the intervening dielectric layer 14. The dielectric layer 14 adjoins the semiconductor substrate 16 along an interface, and the dielectric layer 14 has an upper surface on which the waveguide core 12 is positioned. In an alternative embodiment, one or more additional dielectric layers comprised of, for example, silicon dioxide may be positioned between the waveguide core 12 and the upper surface of the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride. In alternative embodiments, other materials, such as a III-V compound semiconductor, may be used to form the waveguide core 12.

In an embodiment, the waveguide core 12 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide core 12. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of its constituent material (e.g., silicon nitride).

The waveguide core 12 may include multiple grating lines 18 that define a grating coupler 20. The grating lines 18 may be aligned along a longitudinal axis 22 of the grating coupler 20. The grating lines 18 may be separated by gaps G1. In an embodiment, the pitch and duty cycle of the grating lines 18 may be uniform to define a periodic arrangement. In alternative embodiments, the pitch and/or the duty cycle of the grating lines 18 may be apodized (i.e., non-uniform) to define an aperiodic arrangement. In an alternative embodiment, the grating lines 18 may be curved and nested rather than linear. In an alternative embodiment, the grating lines 18 may be arranged in the rows and columns of a two-dimensional array.

Figure 3:
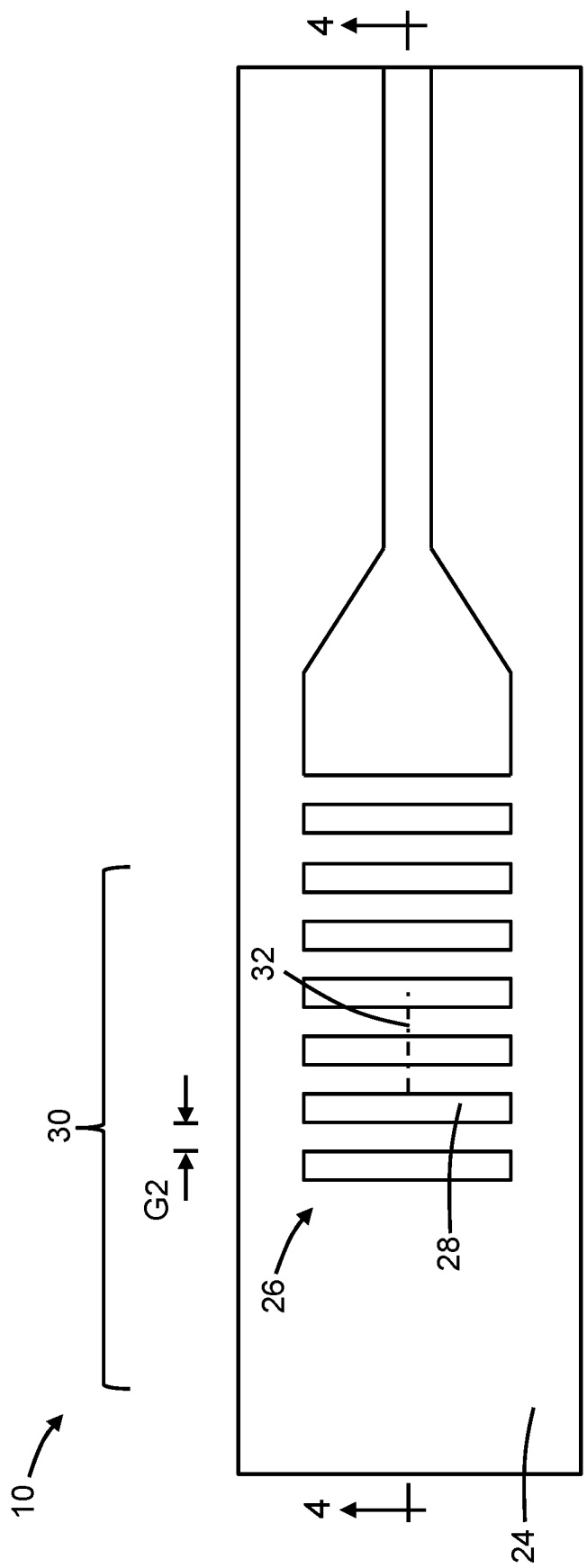
FIG. 3 is a top view of the structure at a fabrication stage of the processing method subsequent to FIGS. 1, 2.
Figure 4:
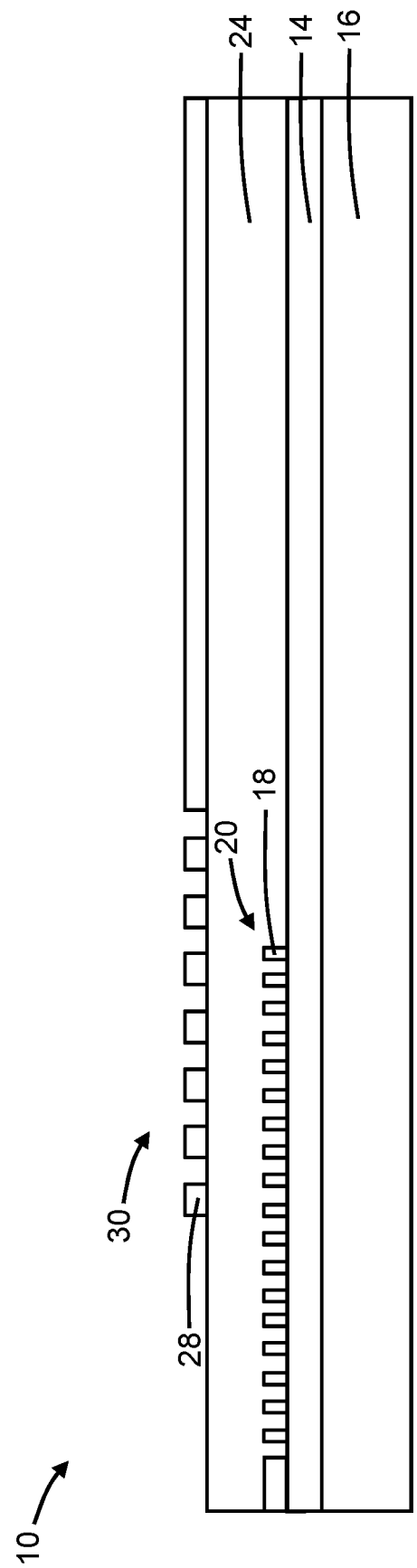
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 24 may be formed over the waveguide core 12. The dielectric layer 24 may be comprised of a dielectric material, such as silicon dioxide. The waveguide core 12, including the grating lines 18 of the grating coupler 20, may be embedded in the dielectric layer 24.

A waveguide core 26 may be formed on, and over, the dielectric layer 24. The dielectric material of the dielectric layer 24 is disposed between the waveguide core 12 and the waveguide core 26. In an embodiment, the waveguide core 26 may be comprised of a material having a refractive index that is greater than the refractive index of silicon dioxide. In an embodiment, the waveguide core 26 may be comprised of a dielectric material, such as silicon nitride, silicon oxynitride, or aluminum nitride. In an alternative embodiment, the waveguide core 26 may be comprised of a semiconductor material, such as amorphous silicon, or polysilicon. In alternative embodiments, other materials, such as a III-V compound semiconductor, may be used to form the waveguide core 26.

In an embodiment, the waveguide core 26 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide core 26. In an embodiment, the waveguide core 26 may be formed by patterning a deposited layer comprised of its constituent material (e.g., silicon nitride).

The waveguide core 26 may include multiple grating lines 28 that define a grating coupler 30. The grating lines 28 may be aligned along a longitudinal axis 32 of the grating coupler 30. The grating lines 28 may be separated by gaps G2. In an embodiment, the pitch and duty cycle of the grating lines 28 may be uniform to define a periodic arrangement. In alternative embodiments, the pitch and/or the duty cycle of the grating lines 28 may be apodized (i.e., non-uniform) to define an aperiodic arrangement. In an alternative embodiment, the grating lines 28 may be curved and nested rather than linear. In an alternative embodiment, the grating lines 28 may be arranged in the rows and columns of a two-dimensional array.

The grating lines 28 of the grating coupler 20 may overlap with at least some of the grating lines 18 of the grating coupler 30. In an embodiment, the overlap may include longitudinal offsets between the grating lines 28 and the grating lines 18.

Figure 5:
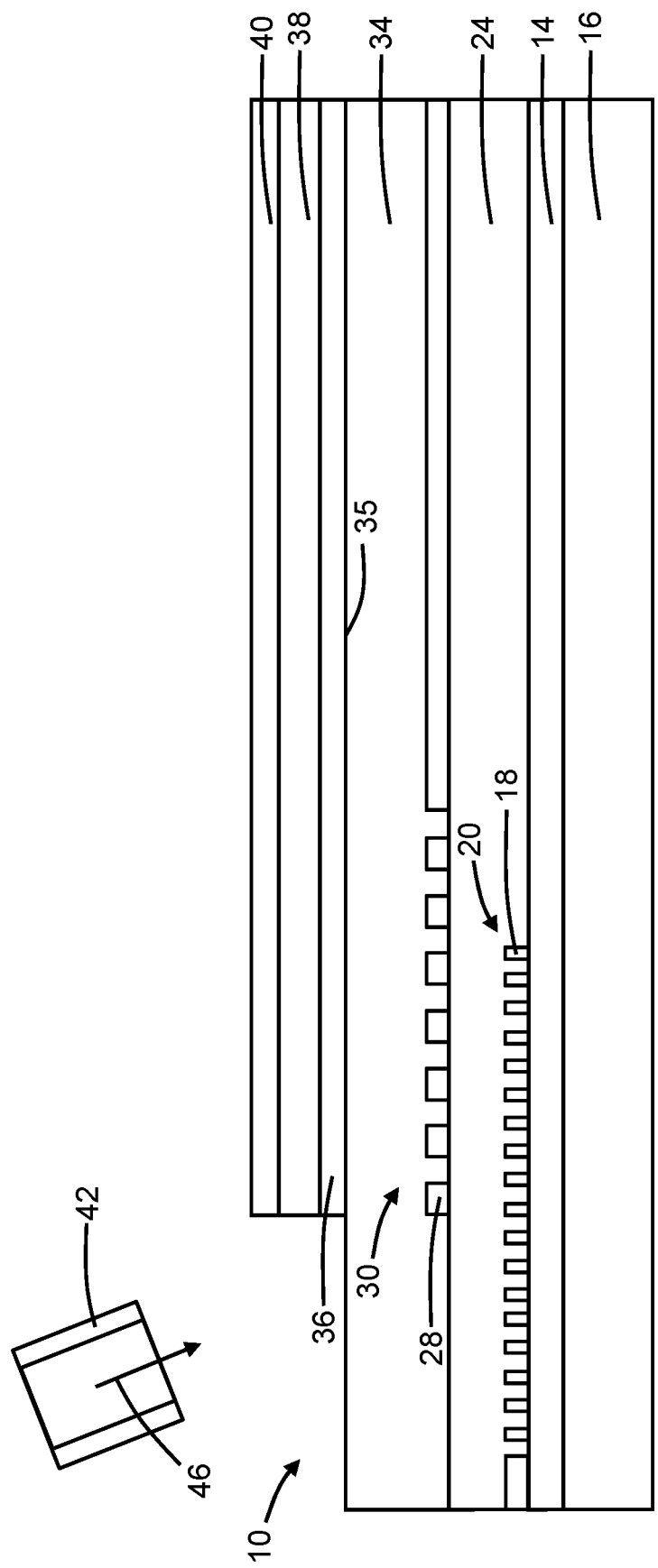
FIG. 5 is a cross-sectional view of the structure at a fabrication stage of the processing method subsequent to FIGS. 3, 4.

With reference to FIG. 5 in which like reference numerals refer to like features in FIGS. 3, 4 and at a subsequent fabrication stage, a dielectric layer 34 may be formed over the waveguide core 26. The dielectric layer 34 may be comprised of a dielectric material, such as silicon dioxide. The waveguide core 26, including the grating lines 28 of the grating coupler 30, may be embedded in the dielectric layer 34.

A layer 36 may be disposed on the dielectric layer 34. The layer 36 may be carried on a dielectric layer 38 and a substrate 40. In an embodiment, the dielectric layer 38 may be comprised of a dielectric material, such as silicon dioxide, having a refractive index that is less than the refractive index of the layer 36, and the substrate 40 may be comprised of silicon, lithium niobate, quartz, or fused silica. In an alternative embodiment, the substrate 40 may be absent. In an alternative embodiment, the substrate 40 may include a sealed undercut beneath all or a portion of the layer 36.

The layer 36 may be bonded to the dielectric layer 34 by a bonding process, such as dielectric bonding or hybrid bonding. The layer 36 may adjoin the dielectric layer 34 along a bonding interface 35, which is disposed between the layer 36 and the dielectric layer 34. The layer 36 may be formed on the dielectric layer 38, and the substrate 40 may be manipulated to place the layer 36 in a contacting relationship with the dielectric layer 34 in advance of the bonding process. In an embodiment, after the contacting relationship is established, a low-temperature thermal anneal may be performed at a sufficient temperature and for a sufficient duration to create a face-to-face bond along the bonding interface 35 between the contacting surfaces of the dielectric layer 34 and the layer 36. In an embodiment, the bonding interface 35 may lack any additional material, such as an adhesive, to promote the bonding between the surface of the dielectric layer 34 and the surface of the layer 36. A portion of the dielectric layer 34 is disposed between the grating coupler 30 and the layer 36.

In an embodiment, the layer 36 may be comprised of a material that exhibits an electric-field-induced Pockels effect in which the refractive index varies in proportional to the strength of an applied electric field according to an electro-optic coefficient. In an embodiment, the layer 36 may be comprised of a crystalline material that lacks inversion symmetry and that is characterized by an optic axis whose refractive index is controllable by an applied electric field. In an embodiment, the layer 36 may be comprised of lithium niobate. In an embodiment, the layer 36 may be comprised of thin film lithium niobate having a thickness in a range of 300 nanometers to 900 nanometers. In alternative embodiments, the layer 36 may be comprised of lithium tantalate, lithium niobate doped with magnesium oxide, or barium titanate. In alternative embodiments, the layer 36 may be comprised of a binary or ternary III-V compound semiconductor material, such as gallium nitride, indium gallium nitride, indium phosphide, indium gallium arsenide, gallium arsenide, indium arsenide, or indium gallium phosphide.

The layer 36 may overlap with at least some of the grating lines 28 of the grating coupler 30. In an embodiment, the layer 36 may overlap with all of the grating lines 28 of the grating coupler 30. In an embodiment, the layer 36 may overlap with at least some of the grating lines 18 of the grating coupler 20. In an embodiment, the layer 36 may be in an unpatterned condition. The ability to avoid patterning the layer 36 by lithography and etching processes may be advantageous if, for example, the material of the layer 36 is difficult to pattern. In an embodiment, the layer 36 may be integrated into an electro-optic modulator providing a photonic component of a photonic integrated circuit.

A light source 42 may be placed adjacent to, and above, the grating coupler 20. In an embodiment, the light source 42 may be an optical fiber that includes a light output 46 that is aimed toward the grating coupler 20 and that is configured to provide light in a mode propagation direction toward the grating coupler 20. In an embodiment, the light source 42 may output light characterized by an infrared wavelength. In an embodiment, the light source 42 may be a single-mode optical fiber. In an embodiment, the light source 42 may be a multi-mode optical fiber. In an alternative embodiment, the light source 42 may be positioned at a side edge of the waveguide core 12 such that the light is provided parallel to the plane of the waveguide core 12, rather than at an angle from above the waveguide core 12.

A light path extends from the light output 46 of the light source 42 to the grating coupler 20. The layer 36 is laterally offset relative to the grating coupler 20 such that the layer 36 does not fully overlap with the grating coupler 20. The light path from the light source 42 to the grating coupler 20 is unobstructed by the layer 36, the dielectric layer 38, and the substrate 40 due to the lateral offset. Light originating from the light source 42 is transferred upwardly from the grating coupler 20 to the grating coupler 30 and is subsequently transferred upwardly from the grating coupler 30 to the layer 36.

The structure 10 includes multiple grating couplers 20, 30 that permit light to be coupled to the layer 36 without modification to the layer 36. For example, the structure 10 may be formed without forming a grating coupler on the layer 36 or patterning the layer 36 to integrate a grating coupler into the layer 36. The grating coupler 20 provides an optical input/output that interfaces with the light source 42 and provides light from below to the layer 36 via the grating coupler 30. The utilization of multiple grating couplers 20, 30 may enable the formation of a compact structure 10. For example, the length of the structure 10 may be reduced because of the utilization of multiple grating couplers 20, 30 to provide light from below to the layer 36. The use of multiple grating couplers 20, 30 to couple light from the light source 42 to the layer 36 may improve the coupling efficiency and reduce light loss. The structure 10 including the multiple grating couplers 20, 30 may enable wafer-level testing of photonic components that include the layer 36 without the need of introducing a long transition region.

Figure 6:
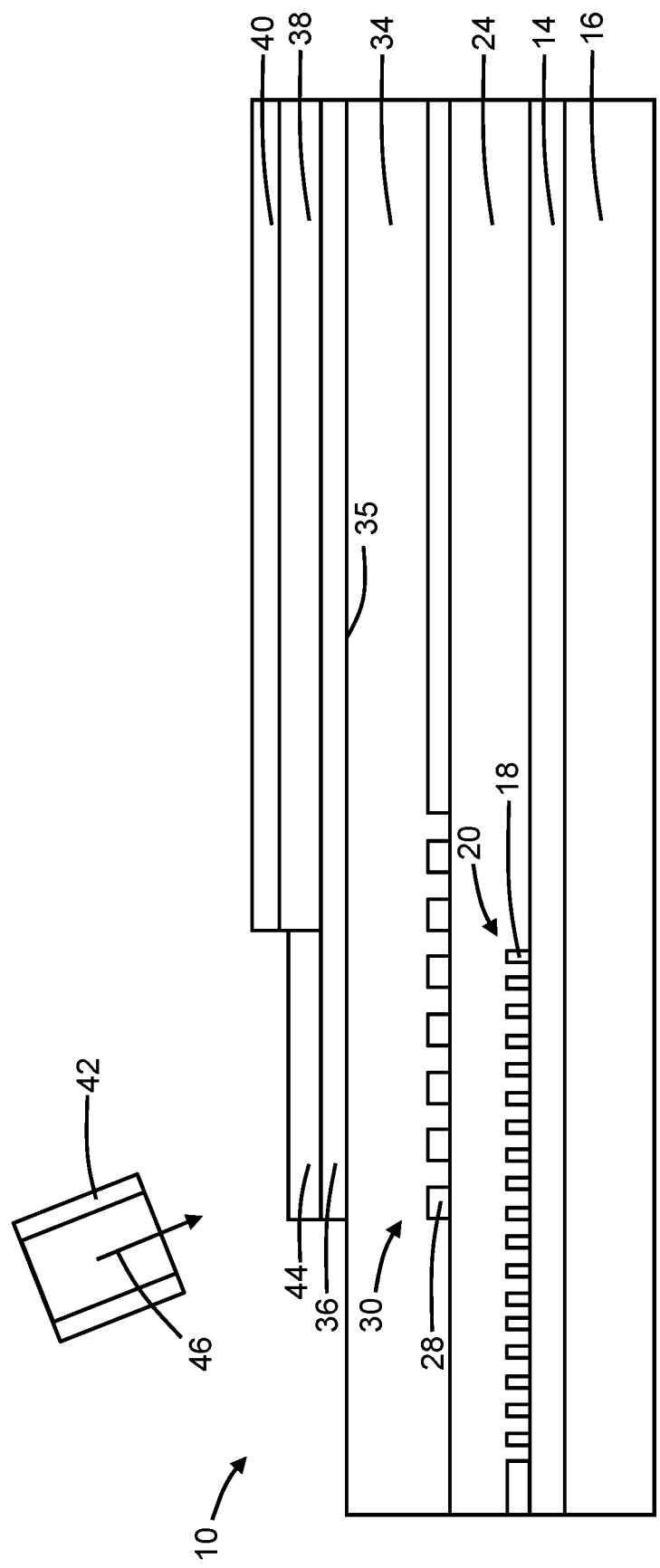
FIG. 6 is a cross-sectional view of a structure in accordance with alternative embodiments of the invention.

With reference to FIG. 6 and in accordance with alternative embodiments, the structure 10 may be modified to add a reflector 44 that is disposed over the grating coupler 30. In an embodiment, the reflector 44 may fully overlap with the grating coupler 30. In an embodiment, the reflector 44 may be a sheet comprised of a reflective material. In an embodiment, the reflector 44 may be comprised of a metal, such as copper, aluminum, cobalt-silicide, nickel-silicide, gold, silver, or tungsten. In an embodiment, the reflector 44 may be comprised of a non-metal material, such as crystalline silicon, polysilicon, amorphous silicon, gallium arsenide, calcium vanadate, strontium vanadate, or silicon germanium. In an alternative embodiment, the reflector 44 may be segmented into sections that are arranged in the rows and columns of a two-dimensional array. The reflector 44 may improve the efficiency of the light coupling from the grating couplers 20, 30 to the layer 36.

Figure 7:
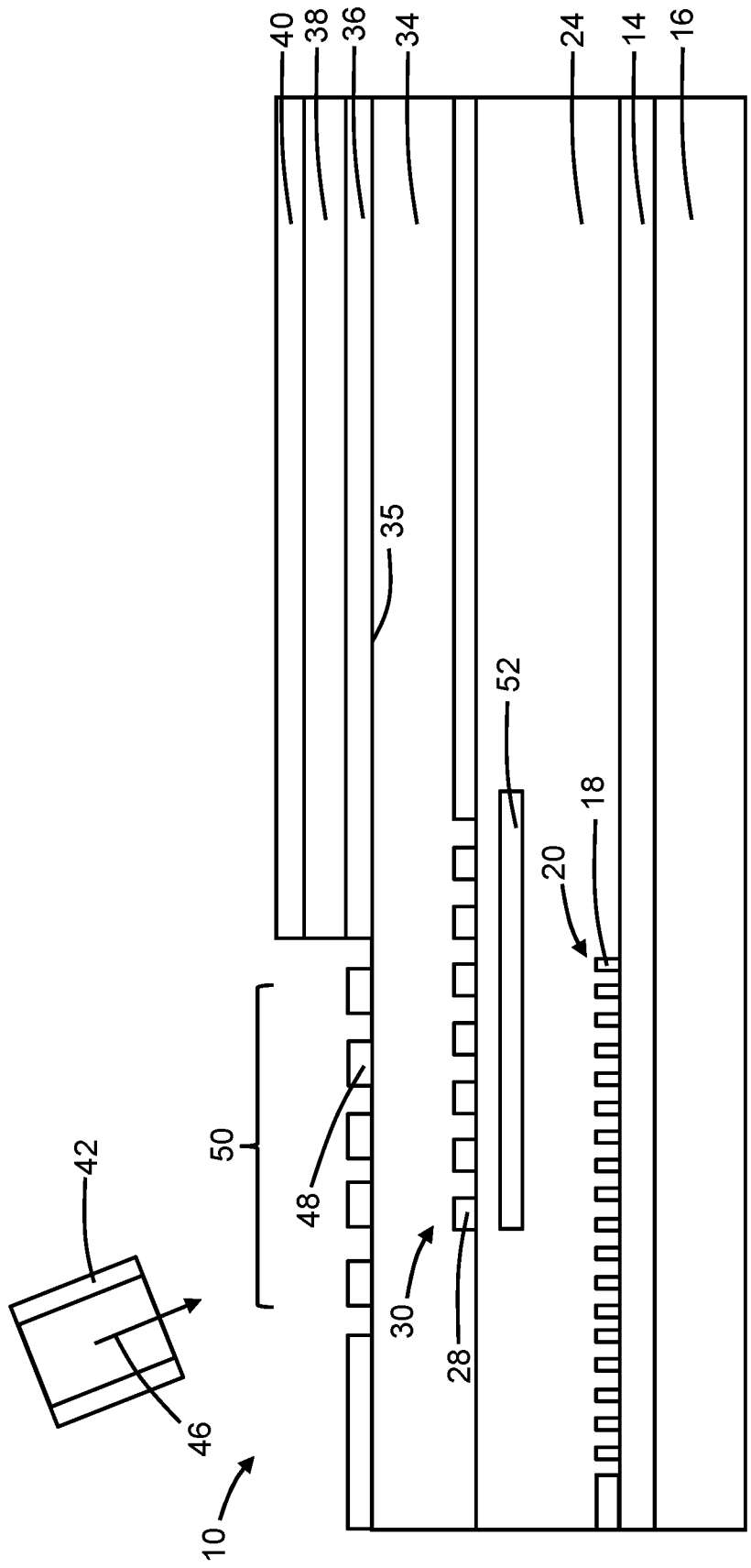
FIG. 7 is a cross-sectional view of a structure in accordance with alternative embodiments of the invention.

With reference to FIG. 7 and in accordance with alternative embodiments, the structure 10 may be modified to form a grating coupler 50 in a portion of the layer 36 that includes multiple grating lines 48 that are separated by gaps. In an embodiment, the pitch and duty cycle of the grating lines 48 may be uniform to define a periodic arrangement. In alternative embodiments, the pitch and/or the duty cycle of the grating lines 48 may be apodized (i.e., non-uniform) to define an aperiodic arrangement. A reflector 52, which may be similar or identical to the reflector 44, may be disposed between the grating coupler 30 and the grating coupler 20. The light path for light from the originating from the light source 42 may intersect each of the grating couplers 20, 30, 50 and the reflector 44 to provide multiple structures capable of directing the light to the layer 36.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A structure for a photonics chip, the structure comprising:
   a first substrate;
   a first grating coupler on the first substrate;
   a second grating coupler having an overlapping relationship with the first grating coupler; and a layer including a portion that has an overlapping relationship with the second grating coupler, the layer comprising a material that exhibits an electro-optic effect, wherein the layer is laterally offset to provide an unobstructed light path from an out-of-plane light source to the first grating coupler so that light is transferred successively, by optical coupling, from the first grating coupler to the second grating coupler and from the second grating coupler to the portion of the layer.

2. The structure of claim 1 wherein the layer fully overlaps with the second grating coupler.

3. The structure of claim 1 wherein the material is lithium niobate.

4. The structure of claim 1 wherein the material is a III-V compound semiconductor.

5. The structure of claim 1 wherein the material is lithium tantalate, lithium niobate doped with magnesium oxide, or barium titanate.

6. The structure of claim 1 wherein the material is crystalline and lacks inversion symmetry.

7. The structure of claim 1 further comprising:
a reflector over the layer,
wherein the layer is disposed between the reflector and the second grating coupler.

8. The structure of claim 7 wherein the reflector is a sheet comprising a metal.

9. The structure of claim 7 wherein the reflector overlaps with the portion of the layer.

10. The structure of claim 1 further comprising:
a second substrate; and
a first dielectric layer on the second substrate,
wherein the layer is disposed on the first dielectric layer.

11. The structure of claim 10 further comprising:
a second dielectric layer that includes a portion between the second grating coupler and the layer.

12. The structure of claim 11 wherein the portion of the second dielectric layer and the layer adjoin along a bonding interface.

13. The structure of claim 1 wherein the portion of the layer includes a third grating coupler having an overlapping relationship with the second grating coupler.

14. The structure of claim 1 wherein the first grating coupler comprises silicon, and the second grating coupler comprises silicon nitride.

15. A structure for a photonics chip, the structure comprising:
a substrate;
a first grating coupler on the substrate; and
a layer including a second grating coupler, the second grating coupler having an overlapping relationship with the first grating coupler, and the layer comprising a material that exhibits an electro-optic effect,
wherein the layer is laterally offset to provide an unobstructed light path from an out-of-plane light source to the first grating coupler so that light is transferred successively, by optical coupling, from the first grating coupler to the second grating coupler and from the second grating coupler to the portion of the layer.

16. The structure of claim 15 further comprising:
a reflector,
wherein the second grating coupler has an overlapping relationship with the reflector.

17. A method of forming a structure for a photonics chip, the method comprising:
forming a first grating coupler on a first substrate;
forming a second grating coupler that has an overlapping relationship with the first grating coupler; and
forming a layer that includes a portion having an overlapping relationship with the second grating coupler, wherein the layer comprises a material that exhibits an electro-optic effect,
wherein the layer is laterally offset to provide an unobstructed light path from an out-of-plane light source to the first grating coupler so that light is transferred successively, by optical coupling, from the first grating coupler to the second grating coupler and from the second grating coupler to the portion of the layer.

18. The method of claim 17 further comprising:
forming a second dielectric layer that includes a portion over the second grating coupler,
wherein the layer is formed on a second substrate, and the layer is bonded to the portion of the second dielectric layer along a bonding interface.

* * * * *